(12) United States Patent
Kurita et al.

(10) Patent No.: US 12,483,001 B2
(45) Date of Patent: Nov. 25, 2025

(54) LIGHTING OPTICAL SYSTEM

(71) Applicant: Panasonic Intellectual Property Management Co., Ltd., Osaka (JP)

(72) Inventors: Aya Kurita, Osaka (JP); Hirokazu Sakaguchi, Osaka (JP)

(73) Assignee: PANASONIC PROJECTOR & DISPLAY CORPORATION, Osaka (JP)

(*) Notice: Subject to any disclaimer, the term of this patent is extended or adjusted under 35 U.S.C. 154(b) by 349 days.

(21) Appl. No.: 18/088,022

(22) Filed: Dec. 23, 2022

(65) Prior Publication Data

US 2023/0208095 A1    Jun. 29, 2023

(30) Foreign Application Priority Data

Dec. 27, 2021 (JP) ................................. 2021-212747
Nov. 7, 2022 (JP) ................................. 2022-178295

(51) Int. Cl.
| | |
|---|---|
| *H01S 3/23* | (2006.01) |
| *G02B 27/28* | (2006.01) |
| *G03B 21/20* | (2006.01) |
| *G03B 33/06* | (2006.01) |
| *H01S 3/00* | (2006.01) |

(52) U.S. Cl.
CPC ........ *H01S 3/2383* (2013.01); *G03B 21/2013* (2013.01); *G03B 21/2033* (2013.01);
(Continued)

(58) Field of Classification Search
CPC . G03B 21/2013; G03B 21/2033; G03B 33/06
(Continued)

(56) References Cited

U.S. PATENT DOCUMENTS

| | | | |
|---|---|---|---|
| 2002/0090172 A1 | 7/2002 | Okazaki et al. | |
| 2009/0122272 A1* | 5/2009 | Silverstein | H04N 9/3161 |
| | | | 353/20 |

(Continued)

FOREIGN PATENT DOCUMENTS

| | | | | |
|---|---|---|---|---|
| CN | 105589287 B | * | 2/2018 | ............ G03B 21/20 |
| CN | 208834084 U | * | 5/2019 | |

(Continued)

OTHER PUBLICATIONS

Translation of 105589287 (Year: 2025).*
(Continued)

*Primary Examiner* — Jerry L Brooks
(74) *Attorney, Agent, or Firm* — Wenderoth, Lind & Ponack, L.L.P.

(57) ABSTRACT

There is provided a low-cost lighting optical system not requiring the refractive element for each laser chip. A lighting optical system includes: a light source including a plurality of multi-emitter laser chips arrayed in a first direction that intersects a light output direction, the plurality of multi-emitter laser chips each having a first emitter outputting first emitter light and a second emitter outputting second emitter light; a plurality of convex lenses each having a center between the first emitter and the second emitter of each of the multi-emitter laser chips, the plurality of convex lenses each arranged in close proximity to a corresponding one of the multi-emitter laser chips; and a first refractive element arranged on light output direction side with respect to the plurality of convex lenses, the first refractive element having a first surface receiving two or more first emitter lights output from the plurality of multi-emitter laser chips and a second surface receiving two or more second emitter lights output from the plurality of multi-emitter laser chips, the first refractive element turning
(Continued)

the first emitter lights and the second emitter lights into approximately parallel lights.

12 Claims, 13 Drawing Sheets

(52) U.S. Cl.
CPC ............ *G03B 33/06* (2013.01); *H01S 3/0071* (2013.01); *G02B 27/286* (2013.01)

(58) Field of Classification Search
USPC .......................................................... 353/20
See application file for complete search history.

(56) References Cited

U.S. PATENT DOCUMENTS

| | | |
|---|---|---|
| 2015/0316234 A1 | 11/2015 | Samonji et al. |
| 2017/0269269 A1 | 9/2017 | Nagashima et al. |
| 2018/0348451 A1* | 12/2018 | Yamamoto ............... G02B 6/42 |

FOREIGN PATENT DOCUMENTS

| | | | | |
|---|---|---|---|---|
| JP | 2002-202442 | | 7/2002 | |
| JP | 2019-148692 | | 9/2019 | |
| JP | 2019148692 A | * | 9/2019 | |
| JP | 2019-211530 | | 12/2019 | |
| WO | 2014/115194 | | 7/2014 | |
| WO | 2016/035349 | | 3/2016 | |
| WO | WO-2016035349 A1 | * | 3/2016 | ......... G02B 19/0057 |
| WO | 2019/230008 | | 12/2019 | |

OTHER PUBLICATIONS

Translation of 208834084 (Year: 2025).*
Translation of 201914892 (Year: 2025).*
Translation of 2016035349 (Year: 2025).*

* cited by examiner

LIGHTING OPTICAL SYSTEM

CROSS-REFERENCE TO RELATED APPLICATIONS

This application claims two priorities of Japanese Patent Application No. 2021-212747 filed on Dec. 27, 2021, and Japanese Patent Application No. 2022-178295 filed on Nov. 7, 2022, the contents of which are incorporated herein by references.

BACKGROUND

1. Technical Field

The present invention relates to a lighting optical system for using, as lighting, lights from a light source including a plurality of multi-emitter laser chips each having a plurality of emitters. The present invention relates to a lighting optical system for condensing lights onto an optical fiber.

2. Description of the Related Art

To input high-output lights to an optical fiber, technology is being considered that condenses, onto the optical fiber, lights from a light source including a plurality of multi-emitter laser chips each having a plurality of emitters.

Although a laser device having a plurality of multi-emitter laser chips allows emission of high-output lights with a reduced size, the laser device involves a problem that light condensing is difficult due to large divergence angle. A technique has thus been disclosed that controls divergence by a refractive element arranged immediately after the position of emission from the laser device (see, e.g., JP2019-148692A).

However, there is a problem of needing a multiplicity of complicatedly shaped or minute refractive elements for each of the individual laser chips, resulting in increased costs.

SUMMARY

The present disclosure was conceived in view of the situations, and it is therefore one non-limiting and exemplary embodiment provides a low-cost lighting optical system not requiring the refractive element for each laser chip.

In one general aspect, the techniques disclosed here feature: a lighting optical system includes:
  a light source including a plurality of multi-emitter laser chips arrayed in a first direction that intersects a light output direction, the plurality of multi-emitter laser chips each having a first emitter outputting first emitter light and a second emitter outputting second emitter light;
  a plurality of convex lenses each having a center between the first emitter and the second emitter of each of the multi-emitter laser chips, the plurality of convex lenses each arranged in close proximity to a corresponding one of the multi-emitter laser chips; and
  a first refractive element arranged on light output direction side with respect to the plurality of convex lenses, the first refractive element having a first surface receiving two or more first emitter lights output from the plurality of multi-emitter laser chips and a second surface receiving two or more second emitter lights output from the plurality of multi-emitter laser chips, the first refractive element turning the first emitter lights and the second emitter lights into approximately parallel lights.

According to the lighting optical system of the present invention, two emitter lights from a plurality of multi-emitter laser chips can separately be turned into approximately parallel lights by a single first refractive element. In consequence, the refractive element need not be prepared for each of the multi-emitter laser chips, enabling the lighting optical system to be configured at low costs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which the same members are designated by the same reference numerals and in which.

DETAILED DESCRIPTION

Figure 1:
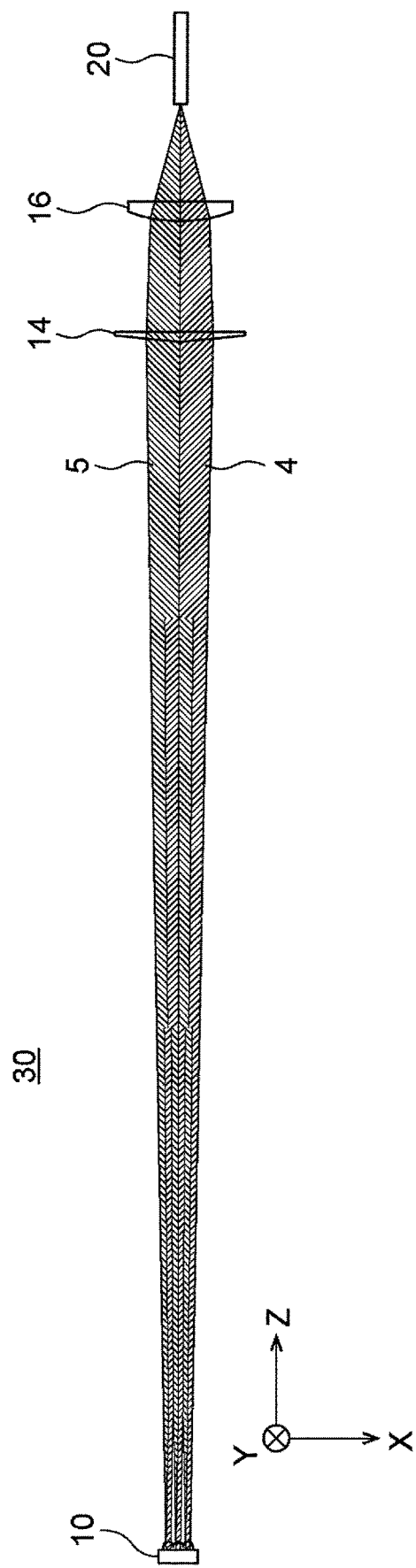
FIG. 1 is a schematic view showing an overall configuration of a lighting optical system according to a first embodiment.

A lighting optical system according to a first aspect, includes:
- a light source including a plurality of multi-emitter laser chips arrayed in a first direction that intersects a light output direction, the plurality of multi-emitter laser chips each having a first emitter outputting first emitter light and a second emitter outputting second emitter light;
- a plurality of convex lenses each having a center between the first emitter and the second emitter of each of the multi-emitter laser chips, the plurality of convex lenses each arranged in close proximity to a corresponding one of the multi-emitter laser chips; and
- a first refractive element arranged on light output direction side with respect to the plurality of convex lenses, the first refractive element having a first surface receiving two or more first emitter lights output from the plurality of multi-emitter laser chips and a second surface receiving two or more second emitter lights output from the plurality of multi-emitter laser chips, the first refractive element turning the first emitter lights and the second emitter lights into approximately parallel lights.

Further, as a lighting optical system of second aspect, in the first aspect, wherein the first refractive element may be arranged within a range where a distance x from the light source satisfies a formula below $$x \geq d/\tan\theta$$

where:
- d is a distance between an optical axis and a center of an outermost multi-emitter laser chip farthest from an optical axis, of the plurality of multi-emitter laser chips; and
- θ is an angle defined between the light output direction and the first or the second emitter lights output from the convex lenses.

Further, a lighting optical system of third aspect, in the first aspect, may include:
- a second refractive element arranged on an optical path between the convex lenses and the first refractive element, the second refractive element having a longer focal length than the convex lenses have.

Further, as a lighting optical system of fourth aspect, in the third aspect, wherein the first refractive element may be arranged within a range where a distance x from the light source satisfies a formula below $$x \geq d/\tan(\tan^{-1} d/f + \theta)$$

where:
- f is a focal length of the second refractive element;
- d is a distance between an optical axis and a center of an outermost multi-emitter laser chip farthest from an optical axis, of the plurality of multi-emitter laser chips; and
- θ is an angle defined between the light output direction and the first or the second emitter lights output from the convex lenses.

Further, a lighting optical system of fifth aspect, in the first aspect, may include:
- a first mirror and a second mirror that reflect lights from a half and another half, respectively, of the plurality of multi-emitter laser chips of the light source;
- a third mirror that reflects lights reflected by the first mirror in the light output direction, to turn the lights into S-polarized lights;
- a half-wave plate arranged between the second mirror and the first refractive element, to turn lights reflected by the second mirror into P-polarized lights; and
- a polarization beam splitter that combines the S-polarized lights reflected by the third mirror and the P-polarized lights reflected by the second mirror and having passed through the half-wave plate, toward the first refractive element.

The polarization beam splitter may reflect the S-polarized lights reflected by the third mirror, and may pass the P-polarized lights reflected by the second mirror and having passed through the half-wave plate.

Further, as a lighting optical system of sixth aspect, in the first aspect, wherein
- the plurality of multi-emitter laser chips each may have a third emitter outputting third emitter light between the first emitter and the second emitter, wherein
- each third emitter light may be output by a corresponding one of the convex lenses along the light output direction, and wherein
- the first refractive element may have a third surface receiving the third emitter light between the first surface and the second surface.

Further, as a lighting optical system of seventh aspect, in any one of the first to sixth aspects, wherein the multi-emitter laser chips of the light source each may have the first emitter and the second emitter arranged along the first direction.

Further, a lighting optical system of eighth aspect, in the first aspect or the second aspect, may include:
- a third refractive element arranged on an optical path between the convex lenses and the first refractive element, the third refractive element including a plurality of lenses combined, the third refractive element forming an optical reduction system that reduces width of luminous fluxes from the convex lenses.

Further, as a lighting optical system of ninth aspect, in the first eighth aspect, wherein the light source may be a first light source outputting light of a first wavelength,
the lighting optical system may include:
- a second light source outputting light of a second wavelength different from the first wavelength;
- a third light source outputting light of a third wavelength different from the first and the second wavelengths; and a combining optical system that combines light of the first wavelength output from the first light source, light of the second wavelength output from the second light source, and light of the third wavelength output from the third light source, into lights having an identical optical axis.

Further, as a lighting optical system of tenth aspect, in any one of the first to ninth aspects, wherein the light source may include the plurality of multi-emitter laser chips arranged both in the first direction and in a second direction intersecting the light output direction.

Further, as a lighting optical system of eleventh aspect, in any one of the first to tenth aspects, may include:
an optical fiber condenser lens that gathers lights from the light sources to enter the lights upon an optical fiber.

A projection type display device of twelfth aspect includes the lighting optical system of any one of the first to eleventh aspects.

Lighting optical systems according to embodiments will now be described with reference to the accompanying drawings, in which substantially the same members are designated by the same reference numerals.

First Embodiment

Figure 2:
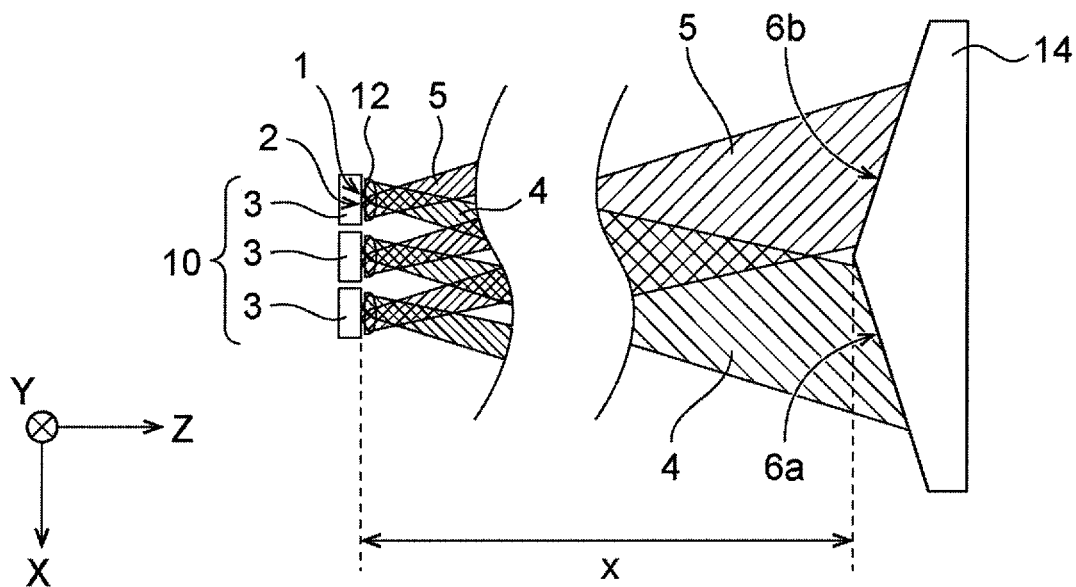
FIG. 2 is a partial enlarged view showing, in an enlarged manner, luminous fluxes in the vicinity of a light source and luminous fluxes in the vicinity of a first refractive element of the lighting optical system of FIG. 1.

FIG. 1 is a schematic view showing an overall configuration of a lighting optical system 30 according to a first embodiment. FIG. 2 is a partial enlarged view showing, in an enlarged manner, luminous fluxes in the vicinity of a light source 10 and luminous fluxes in the vicinity of a first refractive element 14 of the lighting optical system 30 of FIG. 1. For convenience, let Z direction be output direction of light from the light source 10 and let X direction be array direction of a plurality of multi-emitter laser chips 3. The multi-emitter laser chips 3 may be arrayed along Y direction from the front to the back of the page.

The lighting optical system 30 according to the first embodiment includes the light source 10 having the plurality of multi-emitter laser chips 3 arrayed, a plurality of convex lenses 12, the first refractive element 14, and an optical fiber condenser lens 16. The multi-emitter laser chips 3 each have a first emitter 1 outputting a first emitter light 4 and a second emitter 2 outputting a second emitter light 5. The plurality of convex lenses 12 each have a center between the first emitter 1 and the second emitter 2 of each of the multi-emitter laser chips 3, and are each arranged in close proximity to the each of the multi-emitter laser chips 3. These convex lenses 12 each refract the first emitter light 4 and the second emitter light 5 so that they intersect with each other in the light output direction. The first refractive element 14 is arranged between the convex lenses 12 and the optical fiber condenser lens 16. The first refractive element 14 has a first surface 6a that receives all the first emitter lights 4 output from the multi-emitter laser chips 3 and a second surface 6b that receives all the second emitter lights 5 output from the multi-emitter laser chips 3. The first refractive element 14 turns all the first emitter lights 4 and all the second emitter lights 5 into approximately parallel lights. As used herein, "approximately parallel lights" mean that luminous fluxes leaving the first refractive element 14, of the first emitter lights 4 incident on the first surface 6a of the first refractive element 14 and luminous fluxes leaving the first refractive element 14, of the second emitter lights 5 incident on the second surface 6b of the first refractive element 14 are regarded as substantially parallel lights. It is meant in this case that they are parallel lights whose respective luminous fluxes make an angle of the order of several degrees or less therebetween. The optical fiber condenser lens 16 gathers lights from the light source 10 to enter them upon an optical fiber.

According to the lighting optical system 30, two emitter lights from each of the multi-emitter laser chips 3 can separately be turned into approximately parallel lights by the single first refractive element 14 having a simple shape. Thus, the refractive element need not be prepared for each of the multi-emitter laser chips 3, enabling the lighting optical system to be configured at low costs.

The members making up the lighting optical system 30 will hereinafter be described.

<Light Source>

The light source 10 is configured including the multi-emitter laser chips 3 arrayed along X direction (first direction) intersecting the light output direction (Z direction).

<Multi-Emitter Laser Chip>

The multi-emitter laser chip 3 has the first emitter 1 outputting the first emitter light 4 and the second emitter 2 outputting the second emitter light 5. The first emitter 1 and the second emitter 2 may be arranged along the first direction (X direction). When emitted from the first emitter 1 and the second emitter 2, respectively, the first emitter light 4 and the second emitter light 5 are emitted with their respective optical axes in the light output direction (Z direction). Due to the multi-emitter configuration, the emitters as the minimum units outputting light can be densely arranged as compared with the single-emitter configuration, achieving high output and reduction in size of luminous flux.

Although in FIG. 2, the multi-emitter laser chips 3 are arrayed along X direction, this is not limitative and they may be arranged along Y direction. They may be arrayed in both X direction and Y direction.

<Convex Lens>

The convex lenses 12 each are arranged in close proximity to each of the multi-emitter laser chips 3. These convex lenses 12 each refract the first emitter light 4 and the second emitter light 5 so that they intersect with each other in the light output direction (Z direction). That is, the first emitter light 4 travels in Z direction tilted toward +X direction, while the second emitter light 5 travels in Z direction tilted toward −X direction. The first emitter light 4 output from the first emitter 1 and the second emitter light 5 output from the second emitter 2 are incident on each of the convex lenses 12. The convex lenses 12 suppress divergence of their respective input first and second emitter lights 4 and 5, to output their respective luminous fluxes. In this case, common use of one convex lens 12 for the two emitters 1 and 2 makes it difficult to perfectly collimate the first and second lights output from the convex lens 12, making approximately parallel lights.

<First Refractive Element>

The first refractive element 14 is arranged on an optical path between the convex lenses 12 and the optical fiber condenser lens 16. The first refractive element 14 has the first surface 6a receiving two or more e.g. all first emitter lights 4 output from the multi-emitter laser chips 3 and the second surface 6b receiving two or more e.g. all second emitter lights 5 output from the multi-emitter laser chips 3. The second surface 6b and the first surface 6a are disposed along the first direction (X direction) with an optical axis of the first refractive element 14 in between. In the case of FIG. 2, the second surface 6b is arranged in −X direction from the optical axis, while the first surface 6a is arranged in X direction from the optical axis. As shown in FIG. 2, for example, the first refractive element 14 is convex toward the convex lenses 12, with the first surface 6a and the second surface 6b being in contact with the optical axis. The first refractive element 14 is arranged apart from a distance where all the first emitter lights 4 output from the multi-emitter laser chips 3 and all the second emitter lights 5 output from the multi-emitter laser chips 3 separate from each other, so that the separate first surface 6a and second surface 6b can receive all the first emitter lights 4 and all the second emitter lights 5, respectively.

As shown in FIG. 2, the first emitter light 4 and the second emitter light 5 output from the first emitter 1 and the second emitter 2, respectively, of each of the multi-emitter laser chips 3 travel so as to intersect with each other in Z direction by a corresponding one of the convex lenses 12. It can be seen that all the first emitter lights 4 and all the second emitter lights 5 separate from each other according as the distance from the convex lenses 12 increases. Thus, the first refractive element 14 having the first surface 6a receiving all the first emitter lights 4 and the second surface 6b receiving all the second emitter lights 5 is positioned at a distance x where all the first emitter lights 4 and all the second emitter lights 5 perfectly separate from each other.

This eliminates the need to adjust a plurality of refractive elements corresponding to individual laser chips as required in the prior art, enabling output lights of the plurality of laser chips to be collimated at low costs merely by adjusting one refractive element.

In the case where the first surface 6a and the second surface 6b are planar surfaces as shown in FIG. 2, luminous fluxes leaving the first refractive element 14 turn into approximately parallel lights, instead of turning into perfect parallel lights. However, its simple shape facilitates its production with low tolerance sensitivity to misalignment in X direction. The first refractive element 14 may have a planar surface continuous in Y direction (depth direction). Although the first surface 6a and the second surface 6b are configured such that ends of both the surfaces are in contact with each other at the center, this is not limitative, and a gap may be disposed between the first surface 6a and the second surface 6b.

The surfaces of the first refractive element 14 are not limited to planar surfaces, and may be curved surfaces having a curvature such as cylindrical spherical or aspherical surfaces. The curved surfaces may be concave or convex (in −Z direction) toward the convex lenses 12. For example, the concave shape allows an inflection point to occur at the center of the optical axis and is relatively complicated and difficult to make, but it can improve the luminous flux collimation performance to increase the efficiency of condensing light onto the optical fiber. The convex shape is relatively easy to make with no inflection point at the center of the optical axis, but has low collimation performance. On the other hand, in the case of the convex shape, its central portion becomes perpendicular to light rays, which can avoid the problem that lights have untended angles even if the lights are incident on the opposite surface from the center when separation of the lights from the two emitters is insufficient. The shape of the curved surface should be adjusted as needed.

The first refractive element 14 is not limited to a transmissive element such as a prism or a lens, and may be a mirror that turns directions of lights by reflection to make approximately parallel lights. The mirror may be a curved mirror.

<Relationship in Distance between Light Source and First Refractive Element>

Figure 3A:
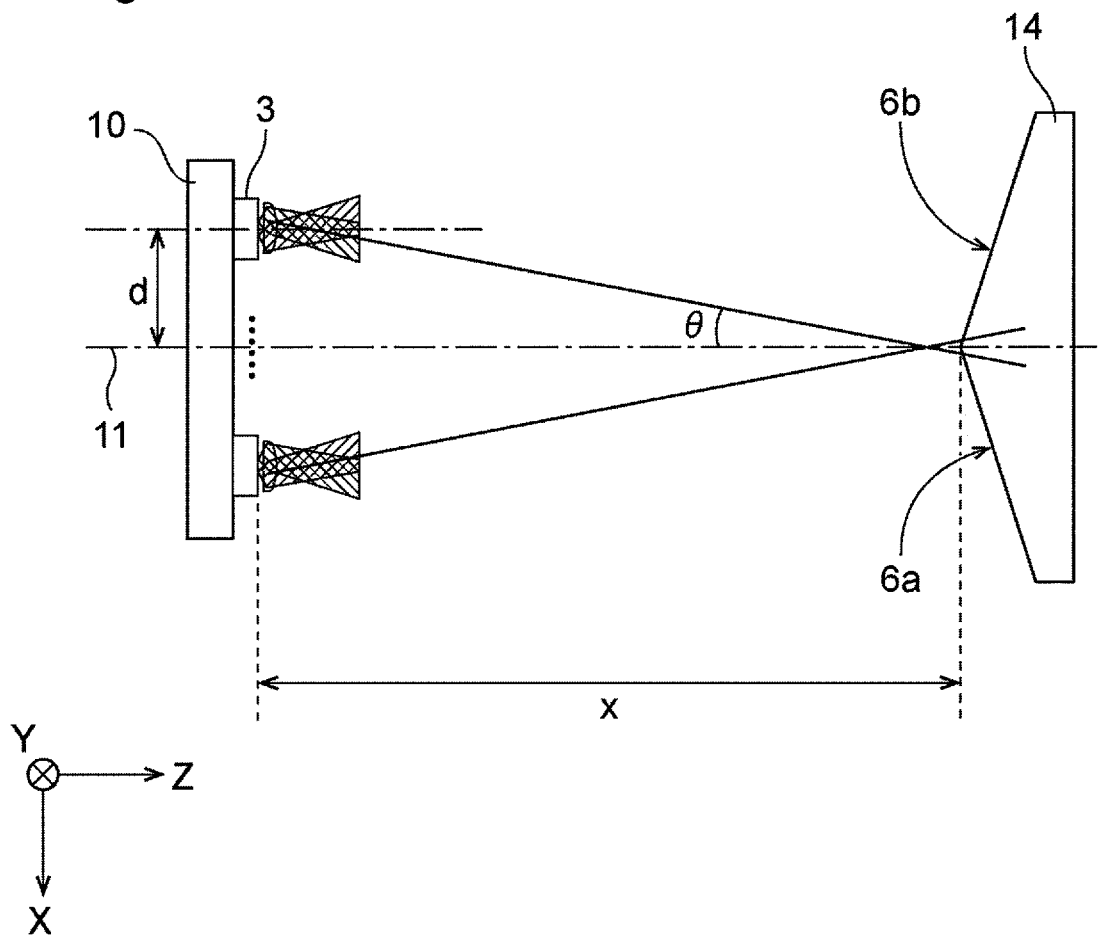
FIG. 3A is a schematic view showing a relationship in distance between the light source and the first refractive element of FIG. 2.
Figure 3B:
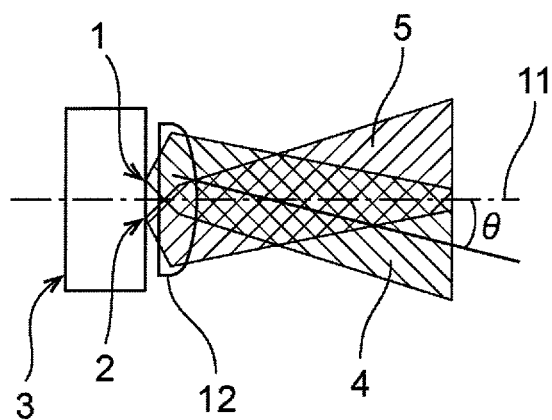
FIG. 3B is a schematic view showing an angle θ defined between the first emitter light and the light output direction of a plurality of multi-emitter laser chips that intersect with each other in the vicinity of the light source of FIG. 3A.

FIG. 3A is a schematic view showing a relationship in distance x between the light source 10 and the first refractive element 14 of FIG. 2. FIG. 3B is a schematic view showing an angle θ defined between the first emitter light 4 and the light output direction (Z direction) of a plurality of multi-emitter laser chips that intersect with each other in the vicinity of the light source 10 of FIG. 3A.

As shown in FIGS. 3A and 3B, the distance x between the light source 10 and the first refractive element 14 is expressed by Formula (1) which follows. For example, x is about 750 mm.

$$x \geq d/\tan\theta \quad (1)$$

where:
d denotes a distance between an optical axis 11 of the light source 10 and an optical axis of an outermost multi-emitter laser chip 3 farthest from the optical axis 11 of the light source 10, of the multi-emitter laser chips 3 of the light source 10; and
θ denotes an angle defined between the first emitter light 4 and the light output direction (Z direction).

As shown in FIG. 3A, the first refractive element 14 is arranged so that the distance x between the light source 10 and the first refractive element 14 satisfies Formula (1), whereby all the first emitter lights 4 and second emitter lights 5 output from the multi-emitter laser chips 3 can separately be directed upon the first refractive element 14, to make approximately parallel lights.

<Optical Fiber Condenser Lens>

Lights from the light source are gathered and entered upon the optical fiber by the optical fiber condenser lens 16.

Second Embodiment

Figure 4:
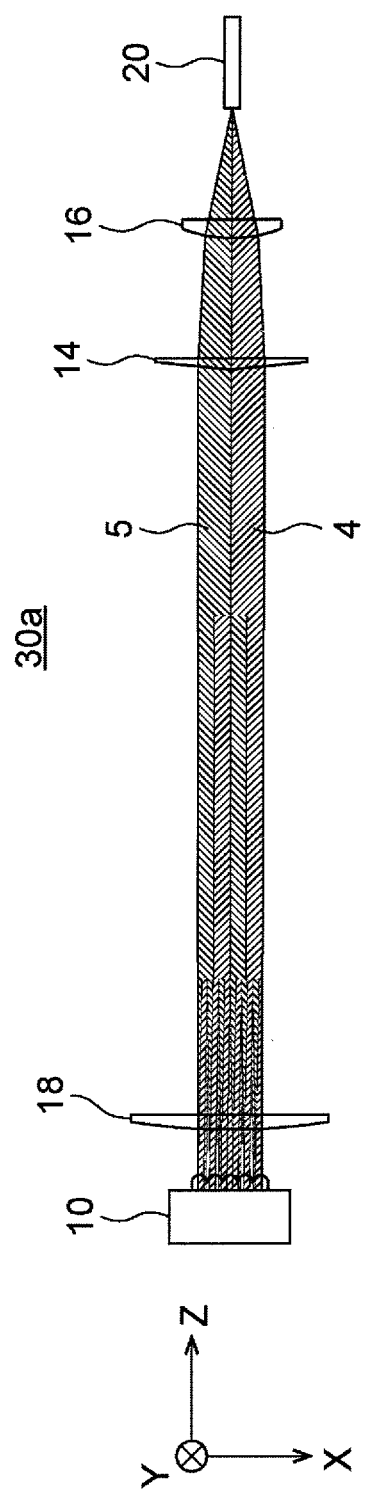
FIG. 4 is a schematic view showing an overall configuration of a lighting optical system according to a second embodiment.
Figure 5A:
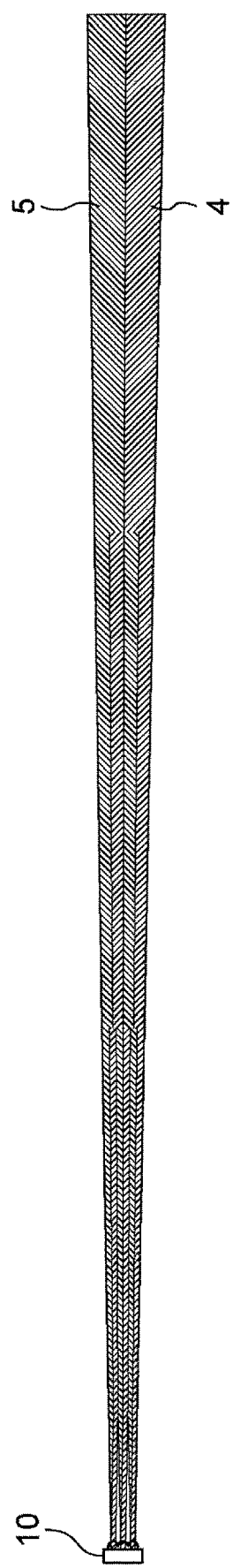
FIG. 5A is a schematic view showing a spread of luminous fluxes immediately before the first refractive element of the lighting optical system of FIG. 1 not using a second refractive element.
Figure 5B:
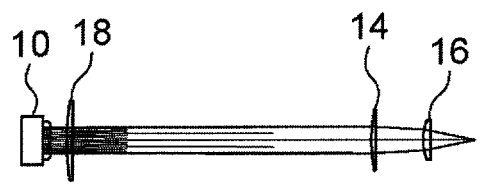
FIG. 5B is a schematic view showing, on a scale reduced to the same of FIG. 5A, a spread of luminous fluxes immediately before the first refractive element of the lighting optical system of FIG. 4 that uses the second refractive element.

FIG. 4 is a schematic view showing an overall configuration of a lighting optical system 30a according to a second embodiment. FIG. 5A is a schematic view showing a spread of luminous fluxes immediately before the first refractive element 14 of the lighting optical system 30 of FIG. 1 not using a second refractive element. FIG. 5B is a schematic view showing, on a scale reduced to the same of FIG. 5A, a spread of luminous fluxes immediately before the first refractive element 14 of the lighting optical system 30a of FIG. 4 that uses a second refractive element 18.

The lighting optical system 30a according to the second embodiment differs from the lighting optical system of the first embodiment in that the former has a second refractive element 18 disposed on the optical path between the convex lenses 12 and the first refractive element 14. Disposition of the second refractive element 18 shortens the distance where all the first emitter lights 4 and all the second emitter lights 5 perfectly separate from each other, achieving a shorted overall length, as compared with the case (FIG. 5A) not using the second refractive element.

<Second Refractive Element>

Figure 6A:
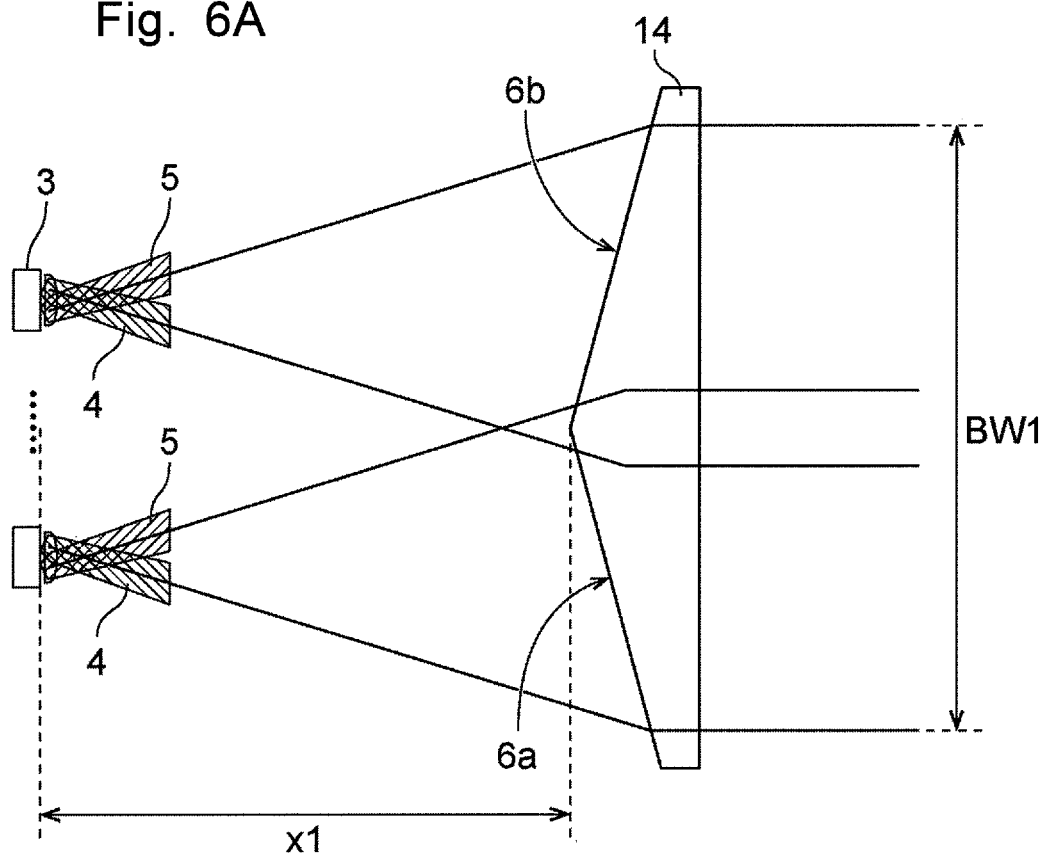
FIG. 6A is a schematic view showing optical paths of first emitter lights and second emitter lights up to the first refractive element in the case of FIG. 5A not using the second refractive element.
Figure 6B:
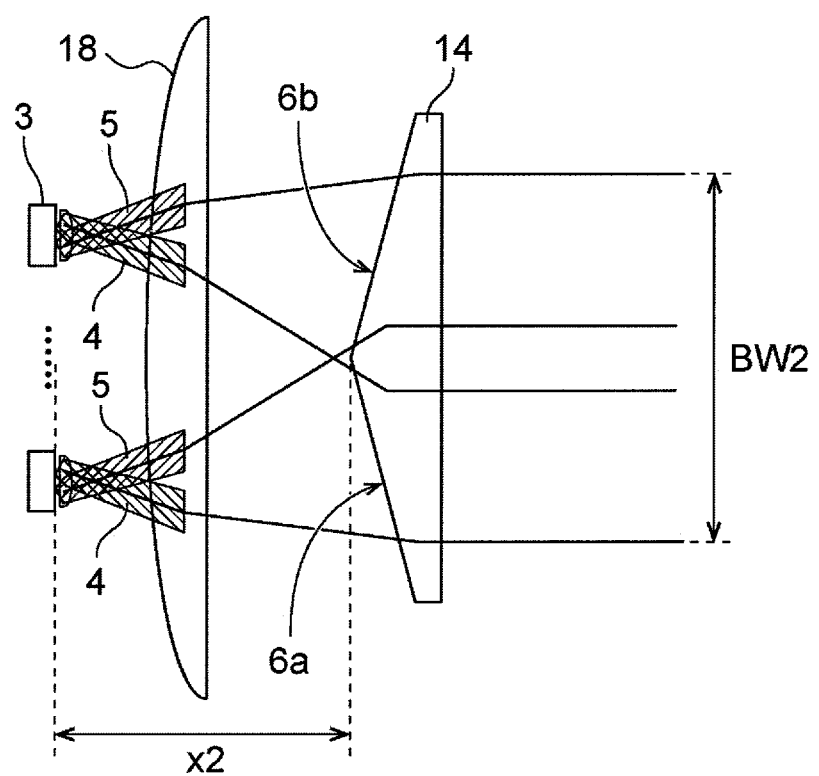
FIG. 6B is a schematic view showing optical paths of the first emitter lights and the second emitter lights up to the first refractive element in the case of FIG. 5B using the second refractive element.

FIG. 6A is a schematic view showing optical paths of the first emitter lights 4 and the second emitter lights 5 up to the first refractive element in the case of FIG. 5A not using the second refractive element. FIG. 6B is a schematic view showing optical paths of the first emitter lights 4 and the second emitter lights 5 up to the first refractive element 14 in the case of FIG. 5B using the second refractive element 18.

The second refractive element 18 has a longer focal length than the convex lenses 12 have. Comparing FIG. 6B with FIG. 6A, this shortens the distance where all the first emitter lights 4 and all the second emitter lights 5 perfectly separate from each other. That is, by the second refractive element 18, the first emitter lights 4 are refracted more toward +X direction and the second emitter lights 5 are refracted more toward −X direction. It thus becomes possible to reduce the distance between the light source 10 and the first refractive element 14, from x1 to x2. For example, in the case of using the second refractive element 18 with a focal length f of 200 mm, separation can be achieved at the distance of about 200 mm. The focal length f of the second refractive element 18 is, for example, 80 mm or more.

As shown in FIGS. 6A and 6B, by shortening the distance where all the first emitter lights 4 and all the second emitter lights 5 perfectly separate from each other, the luminous flux width can also be reduced from BW1 to BW2.

In the case of using the second refractive element 18, all the first emitter lights 4 reaching the first surface 6a of the first refractive element 14 are not parallel to each other, and all the second emitter lights 5 reaching the second surface 6b are also not parallel to each other. Therefore, the first surface 6a and the second surface 6b of the first refractive element 14 may be surfaces having a curvature, instead of planar surfaces.

<Relationship in Distance between Light Source and Refractive Element>

Figure 7A:
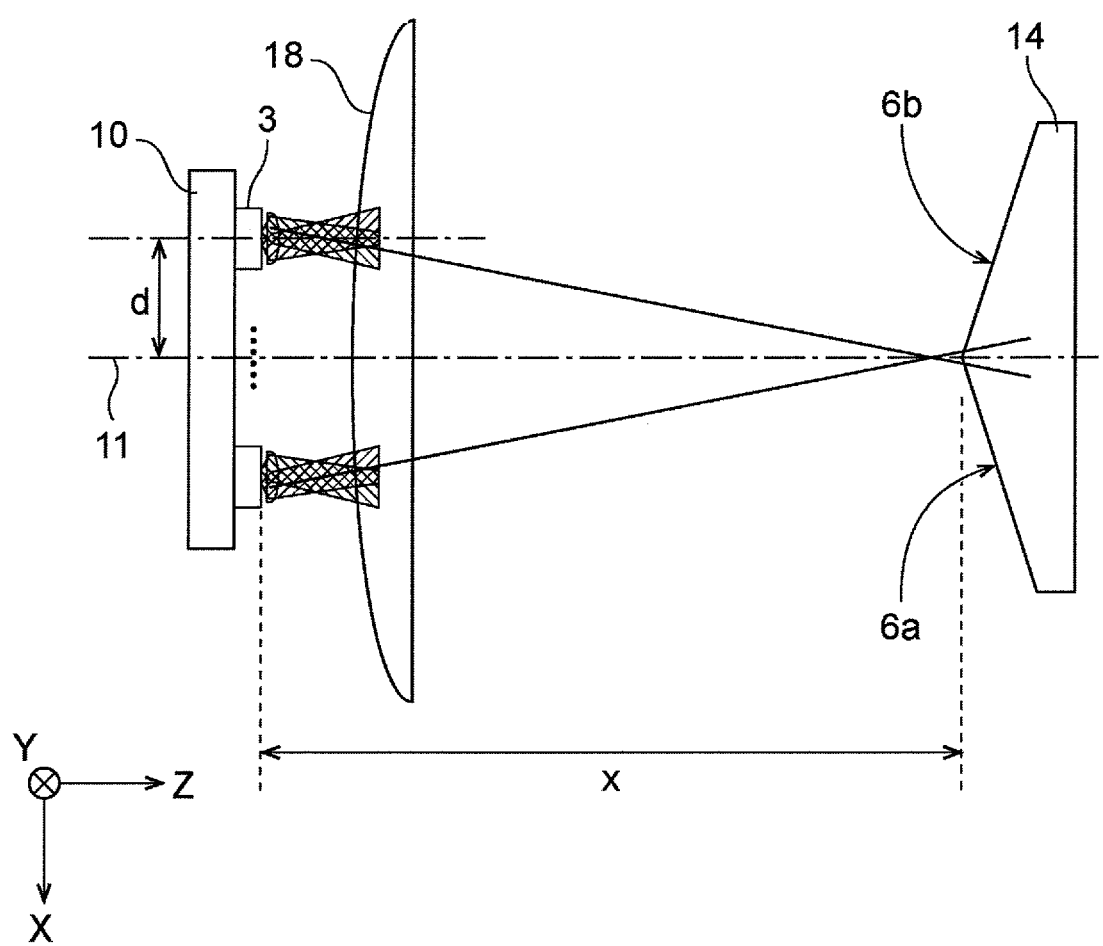
FIG. 7A is a schematic view showing a relationship in distance between the light source and the first refractive element of FIG. 6B.
Figure 7B:
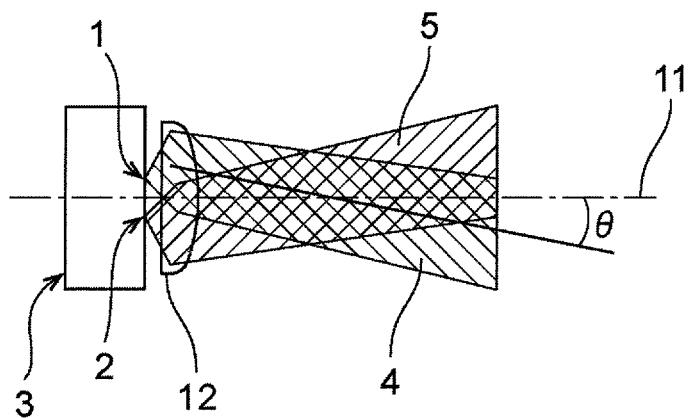
FIG. 7B is a schematic view showing an angle θ defined between the first emitter light and the light output direction of a plurality of multi-emitter laser chips that intersect with each other in the vicinity of the light source of FIG. 7A.

FIG. 7A is a schematic view showing a relationship in distance between the light source 10 and the first refractive element 14 of FIG. 6B. FIG. 7B is a schematic view showing an angle θ defined between the first emitter light 4 and the light output direction (Z direction) of a plurality of multi-emitter laser chips that intersect with each other in the vicinity of the light source 10 of FIG. 7A.

As shown in FIGS. 7A and 7B, the distance x between the light source 10 and the first refractive element 14 is expressed by Formula (2) which follows.

$$x \geq d/\tan\left(\tan^{-1}\frac{d}{f} + \theta\right) \quad (2)$$

where:
d denotes a distance between the optical axis 11 of the light source 10 and the optical axis of the outermost multi-emitter laser chip 3 farthest from the optical axis 11 of the light source 10, of the multi-emitter laser chips 3 of the light source 10;
θ denotes an angle defined between the first emitter light 4 and the light output direction (Z direction); and f denotes a focal length of the second refractive element 18.

Different from Formula (1), Formula (2) contains the focal length f of the second refractive element 18. In FIG. 7A, as compared with FIG. 3A, the first emitter light 4 from the outermost multi-emitter laser chip 3 on −X side is refracted toward +X side by the second refractive element 18, while the second emitter light 5 from the outermost multi-emitter laser chip 3 on +X side is refracted toward −X side by the second refractive element 18. As a result, in FIG. 7A, the distance, where the first emitter light 4 from the outermost multi-emitter laser chip 3 on −X side and the second emitter light 5 from the outermost multi-emitter laser chip 3 on +X side reach an intersection with the optical axis 11 of the first refractive element 14, can be made shorter than the case of FIG. 3A.

On the other hand, in FIG. 7A, the first emitter light 4 from the outermost multi-emitter laser chip 3 on +X side is refracted toward −X side by the second refractive element 18. Similarly, the second emitter light 5 from the outermost multi-emitter laser chip 3 on −X side is refracted toward +X side by the second refractive element 18. This can suppress the size of the first surface 6a receiving the first emitter light 4 and the size of the second surface 6b receiving the second emitter light 5 and reduce the luminous flux width BW2.

Third Embodiment

Figure 8:
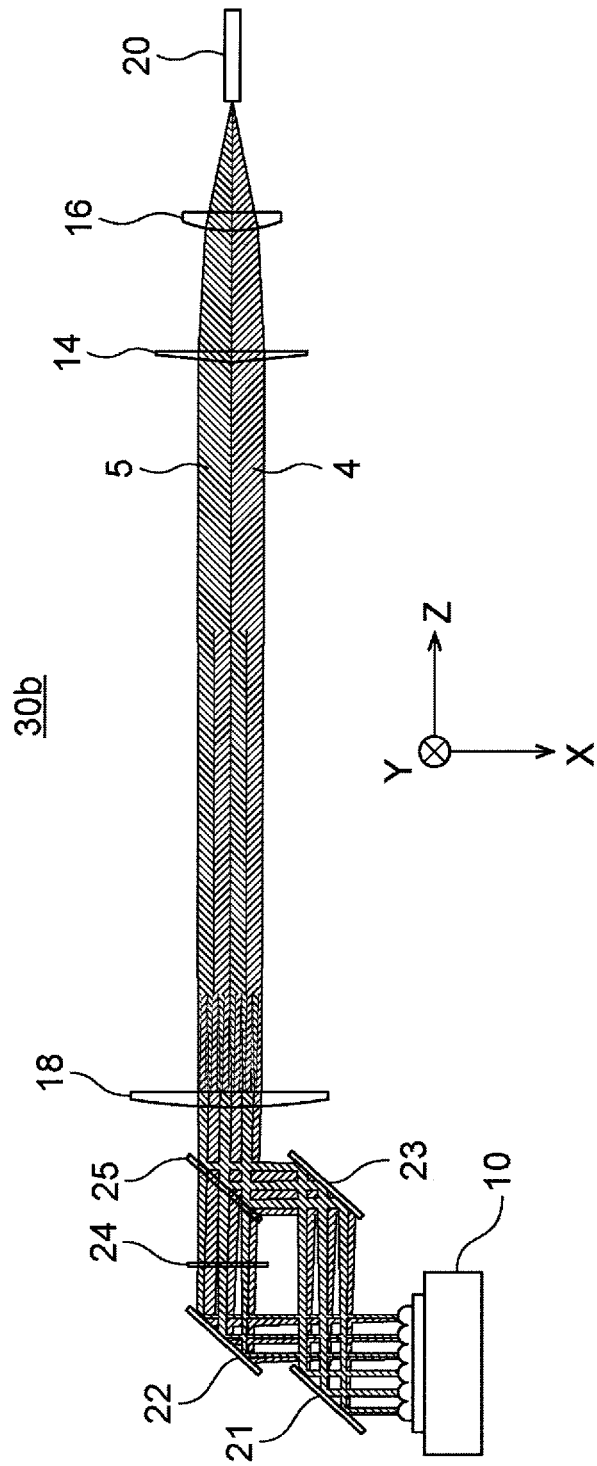
FIG. 8 is a schematic view showing an overall configuration of a lighting optical system according to a third embodiment.

FIG. 8 is a schematic view showing an overall configuration of a lighting optical system 30b according to a third embodiment. As compared with the lighting optical system according to the second embodiment, the lighting optical system 30b according to the third embodiment is characterized in that optical paths from the light source 10 to the second refractive element 18 are configured by using a plurality of mirrors 21, 22, and 23, a half-wave plate 24, and a polarization beam splitter 25. Specifically, lights from left half on −Z side of the multi-emitter laser chips 3 of the light source 10 are reflected approximately 90 degrees by the first mirror 21, while lights from right half on +Z side of the multi-emitter laser chips 3 are reflected approximately 90 degrees by the second mirror 22, so that they separate from each other. Lights reflected by the first mirror 21 are reflected in a light output direction (−X direction) by the third mirror 23, to enter as S-polarized lights into the polarization beam splitter 25. Lights reflected by the second mirror 22 pass through the half-wave plate 24 to incident as P-polarized lights on the polarization beam splitter 25. The S-polarized lights and P-polarized lights incident on the polarization beam splitter 25 are combined to enter the second refractive element 18. The luminous flux width can be halved by combining the two separate lights by the polarization beam splitter 25 in this manner. The reduced luminous flux width can shorten the distance to the first refractive element 14 and facilitate condensing at the condenser lens. This leads to improvement in efficiency of light condensing on the optical fiber.

Fourth Embodiment

Figure 9A:
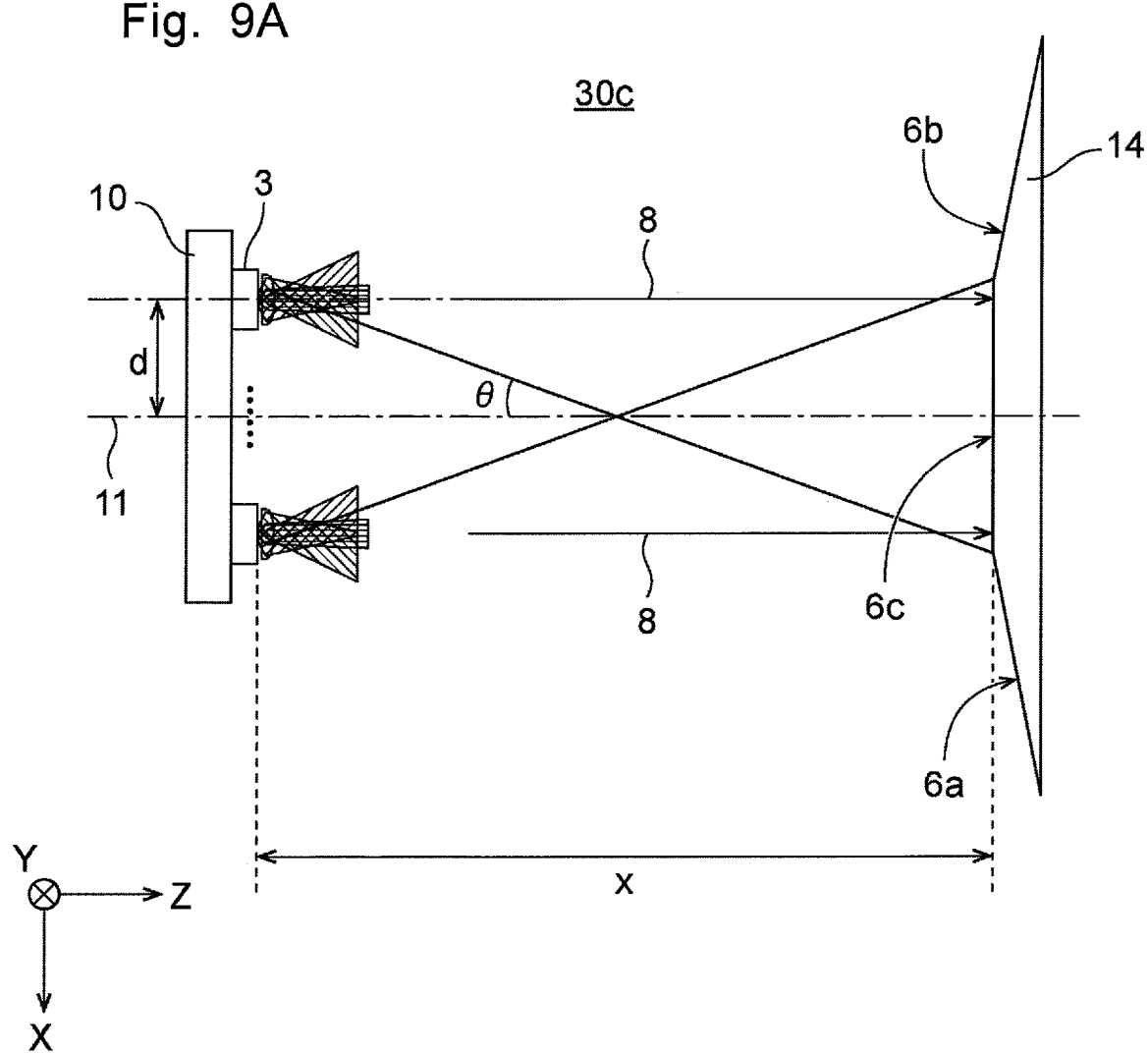
FIG. 9A is a schematic view showing a relationship in distance between the light source and the first refractive element in a lighting optical system according to a fourth embodiment.
Figure 9B:
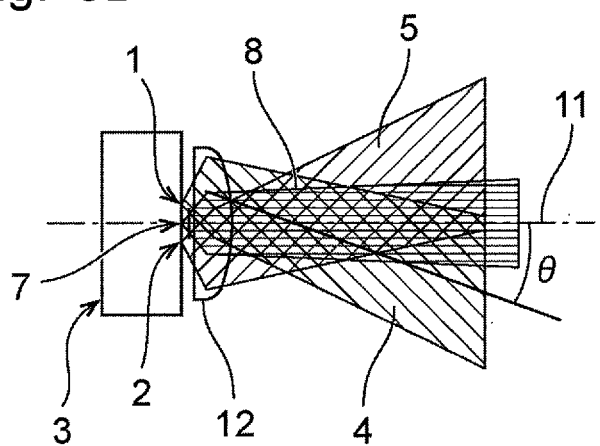
FIG. 9B is a schematic view showing an angle θ defined between the first emitter light and the light output direction of a plurality of multi-emitter laser chips that intersect with each other in the vicinity of the light source of FIG. 9A.

FIG. 9A is a schematic view showing a relationship in distance between the light source 10 and the first refractive element 14 in a lighting optical system 30c according to a fourth embodiment. FIG. 9B is a schematic view showing an angle θ defined between the first emitter light 4 and the light output direction (Z direction) of a plurality of multi-emitter laser chips that intersect with each other in the vicinity of the light source 10 of FIG. 9A.

As compared with the lighting optical system according to the first embodiment, the lighting optical system 30c according to the fourth embodiment is characterized in that the multi-emitter laser chip 3 has a third emitter 7. In this case, the optical axis of third emitter light 8 output from the third emitter 7 is not bent by the convex lens 12 and coincides with the light output direction (Z direction). In the case where the multi-emitter laser chip 3 has the three emitters, the first refractive element 14 has a third surface 6c between the first surface 6a and the second surface 6b. In this case, the third surface 6c perpendicular to the light output direction (Z direction) should receive the third emitter light 8 output from the third emitter 7 lying in the middle of the three emitters.

The distance x between the light source 10 and the first refractive element 14 becomes a distance farther away than in the case of having two emitters. For example, as shown in FIG. 9A, in the case of not using the second refractive element, the length of the third surface 6c in X direction should be at least twice the distance d between the optical axis 11 and the center of the outermost multi-emitter laser chip 3 farthest away from the optical axis 11. In other words, the length of the third surface 6c corresponds to a length 2d. At this time, the distance x between the light source 10 and the first refractive element 14 is twice the distance in the case of FIG. 3A.

The second refractive element may be used also in the case of the lighting optical system according to the fourth embodiment. Use of the second refractive element can shorten the distance between the light source and the first refractive element to suppress the spread of luminous fluxes, consequently rendering it possible to reduce the size of the first refractive element.

Fifth Embodiment

Figure 10:
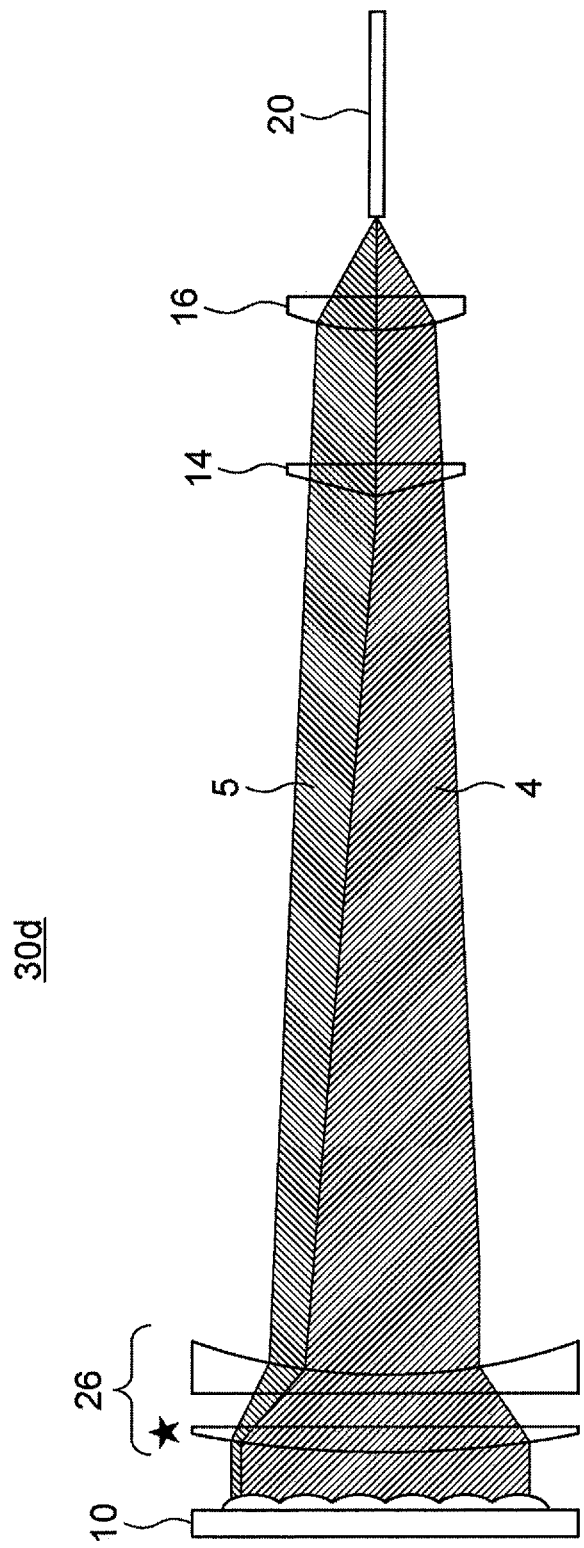
FIG. 10 is a schematic view showing an overall configuration of a lighting optical system according to a fifth embodiment.

FIG. 10 is a schematic view showing an overall configuration of a lighting optical system 30d according to a fifth embodiment.

The lighting optical system 30d according to the fifth embodiment further includes a third refractive element 26: that is arranged on the optical path between the convex lenses 12 and the first refractive element 14; that has a plurality of lenses combined; and that makes up an optical reduction system.

This third refractive element 26 can reduce the width of luminous fluxes and hence improve the efficiency of light condensing on the optical fiber. The light condensing position can be adjusted by displacing, in XYZ directions, one or more elements making up the third refractive element 26. This enables light condensing on the optical fiber 20 at high efficiency even if there occur installation tolerances, etc.

Sixth Embodiment

Figure 11:
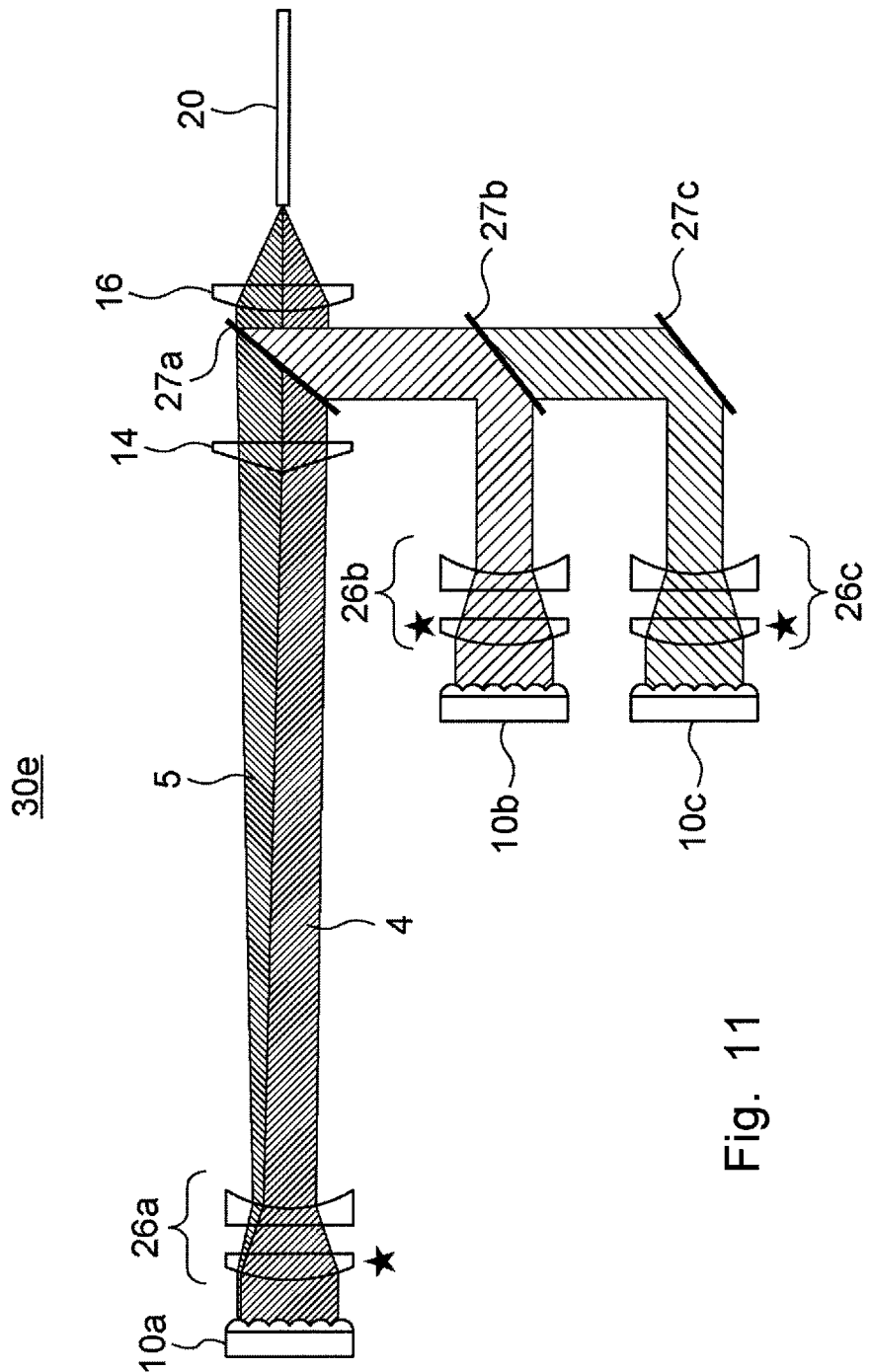
FIG. 11 is a schematic view showing an overall configuration of a lighting optical system according to a sixth embodiment.

FIG. 11 is a schematic view showing an overall configuration of a lighting optical system 30e according to a sixth embodiment.

The lighting optical system 30e according to the sixth embodiment includes: in addition to the lighting optical system 30d of the fifth embodiment, a second light source 10b outputting light of a second wavelength that is different from a first wavelength of a first light source 10a of the lighting optical system 30d of the fifth embodiment; and a third light source 10c outputting light of a third wavelength that is different from the first wavelength and the second wavelength. The lighting optical system 30e according to the sixth embodiment further includes: combining optical systems 27a, 27b and 27c that combine light of the first wavelength output from the first light source 10a, light of the second wavelength output from the second light source 10b, and light of the third wavelength output from the third light source 10c, into light having the same optical axis. As shown in FIG. 11, the combining optical systems 27a, 27b and 27c may be made up of two dichroic mirrors 27a and 27b, and a mirror 27c. The dichroic mirror 27b combines light of the second wavelength and light of the third wavelength, while the dichroic mirror 27a combines the lights of the second and third wavelengths and light of the first wavelength. The second light source 10b and the third light source 10c may include third refractive elements 26b and 26c, respectively, making up the optical reduction system that reduces the width of luminous fluxes. The second light source 10b and the third light source 10c may each be the single emitter, instead of the multi-emitter. The light condensing position can be adjusted by displacing, in XYZ directions, one or more elements making up the third refractive elements 26a, 26b, and 26c. This enables light condensing on the optical fiber 20 at high efficiency even if there occur installation tolerances, etc. Z-direction adjustment makes it possible to absorb aberration effects to condense lights having plural wavelengths at the same position through the single condenser lens.

This disclosure encompasses proper combinations of any embodiment(s) and/or example(s), of the various embodiments and/or embodiments set forth hereinabove, which can provide advantageous effects of the embodiments and/or examples.

According to the lighting optical systems of the present invention, there is no need to prepare for each of the multi-emitter laser chips, enabling the lighting optical systems to be configured at low costs by the single first refractive element. The present invention is applicable to various uses for a projection type display device, etc.

EXPLANATIONS OF LETTERS OR NUMERALS 1 first emitter
2 second emitter
3 multi-emitter laser chip
4 first emitter light
5 second emitter light
6a first surface
6b second surface
6c third surface
7 third emitter
8 third emitter light
10, 10a, 10b, 10c light source
11 optical axis
12 convex lens
14 first refractive element
16 optical fiber condenser lens
18 second refractive element
20 optical fiber
21 first mirror
22 second mirror
23 third mirror
24 half-wave plate
25 polarization beam splitter
26, 26a, 26b, 26c third refractive element (optical reduction system)
27a, 27b, 27c mirror
30, 30a, 30b, 30c, 30d, 30e lighting optical system

What is claimed is:
1. A lighting optical system comprising:
a light source including a plurality of multi-emitter laser chips arrayed in a first direction that intersects a light output direction, the plurality of multi-emitter laser chips each having a first emitter outputting first emitter light and a second emitter outputting second emitter light;
a plurality of convex lenses each having a center between the first emitter and the second emitter of each of the multi-emitter laser chips, the plurality of convex lenses each arranged in close proximity to a corresponding one of the multi-emitter laser chips;
a first refractive element arranged on light output direction side with respect to the plurality of convex lenses, the first refractive element having a first surface receiving two or more first emitter lights output from the plurality of multi-emitter laser chips and a second surface receiving two or more second emitter lights output from the plurality of multi-emitter laser chips; and a second refractive element arranged on an optical path between the convex lenses and the first refractive element, the second refractive element having a longer focal length than the convex lenses have.

2. The lighting optical system of claim 1, wherein the first refractive element is arranged within a range where a distance x from the light source satisfies a formula below $$x \geq d/\tan\theta$$

where:
d is a distance between an optical axis and a center of an outermost multi-emitter laser chip farthest from an optical axis, of the plurality of multi-emitter laser chips; and
θ is an angle defined between the light output direction and the first or the second emitter light output from the convex lenses.

3. The lighting optical system of claim 1, wherein the first refractive element is arranged within a range where a distance x from the light source satisfies a formula below $$x \geq d/\tan(\tan^{-1} d/f + \theta)$$

where:
f is a focal length of the second refractive element;
d is a distance between an optical axis and a center of an outermost multi-emitter laser chip farthest from an optical axis, of the plurality of multi-emitter laser chips; and
θ is an angle defined between the light output direction and the first or the second emitter light output from the convex lenses.

4. The lighting optical system of claim 1, further comprising:
a first mirror and a second mirror that reflect lights from a half and another half, respectively, of the plurality of multi-emitter laser chips of the light source;
a third mirror that reflects lights reflected by the first mirror in the light output direction, to turn the lights into S-polarized lights;
a half-wave plate arranged between the second mirror and the first refractive element, to turn lights reflected by the second mirror into P-polarized lights; and
a polarization beam splitter that combines the S-polarized lights reflected by the third mirror and the P-polarized lights reflected by the second mirror and having passed through the half-wave plate, toward the first refractive element.

5. The lighting optical system of claim 1, wherein the plurality of multi-emitter laser chips each have a third emitter outputting third emitter light between the first emitter and the second emitter, wherein
each third emitter light is output by a corresponding one of the convex lenses along the light output direction, and wherein
the first refractive element has a third surface receiving the third emitter light between the first surface and the second surface.

6. The lighting optical system of claim 1, wherein the multi-emitter laser chips of the light source each have the first emitter and the second emitter arranged along the first direction.

7. The lighting optical system of claim 1, further comprising:
a third refractive element arranged on an optical path between the convex lenses and the first refractive element, the third refractive element including a plurality of lenses combined, the third refractive element forming an optical reduction system that reduces width of luminous fluxes from the convex lenses.

8. The lighting optical system of claim 7, wherein the light source is a first light source outputting light of a first wavelength,
the lighting optical system further comprising:
a second light source outputting light of a second wavelength different from the first wavelength;
a third light source outputting light of a third wavelength different from the first and the second wavelengths; and
a combining optical system that combines light of the first wavelength output from the first light source, light of the second wavelength output from the second light source, and light of the third wavelength output from the third light source, into lights having an identical optical axis.

9. The lighting optical system of claim 1, wherein the light source includes the plurality of multi-emitter laser chips arranged both in the first direction and in a second direction intersecting the light output direction.

10. The lighting optical system of claim 1, further comprising:
an optical fiber condenser lens that gathers lights from the light source to direct the lights upon an optical fiber.

11. A projection type display device comprising the lighting optical system of claim 1.

12. The lighting optical system of claim 1, wherein the first refractive element brings the first emitter light and the second emitter light close in parallel.

* * * * *